(No Model.) 3 Sheets—Sheet 2.

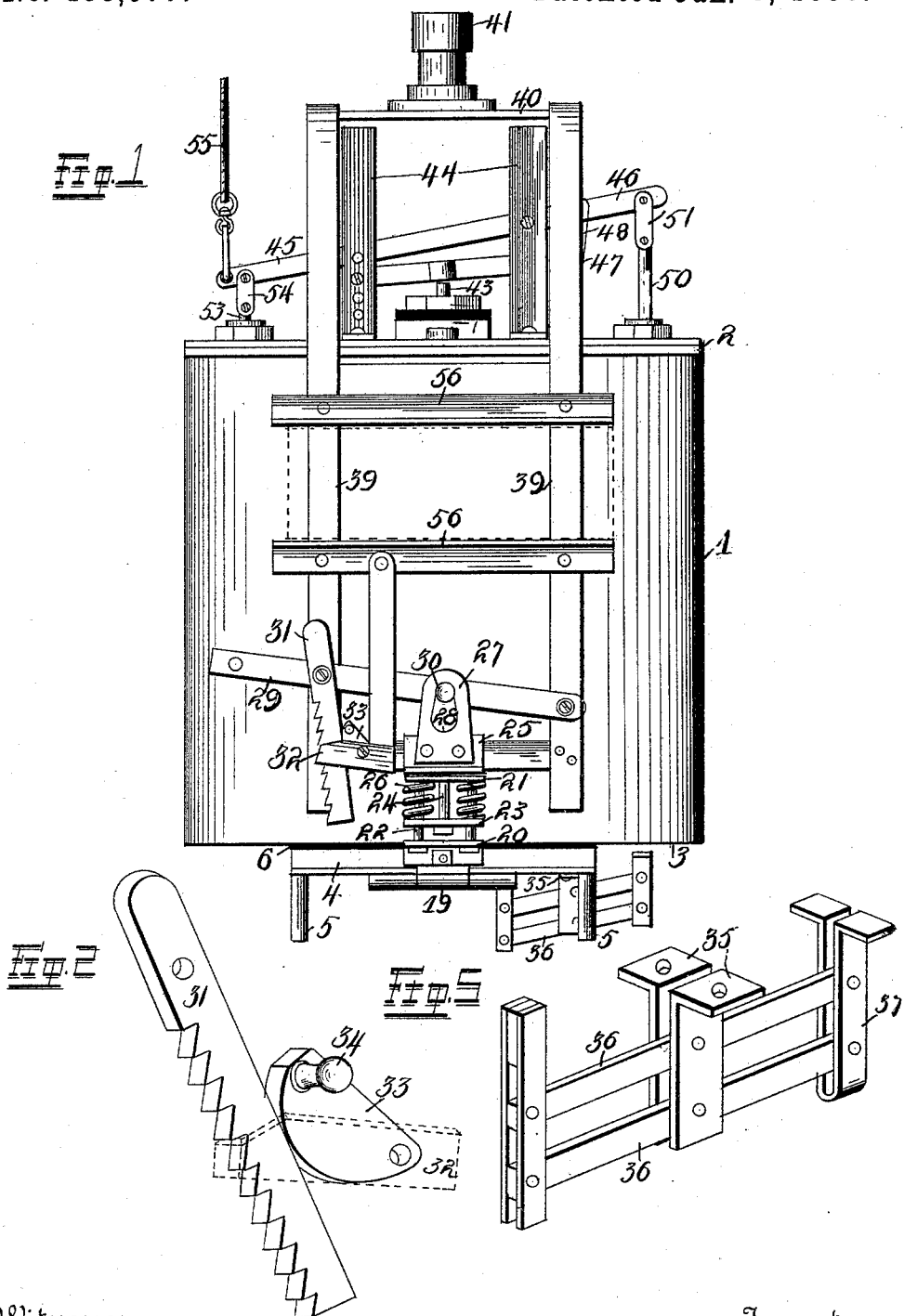

J. H. ARCHER.
WATER PURIFIER.

No. 488,977. Patented Jan. 3, 1893.

Witnesses
A. A. Eicks
C. F. Keller

Inventor
John H. Archer
By his Attorneys Higdon Higdon & Longan (No Model.)     J. H. ARCHER.     3 Sheets—Sheet 3.
WATER PURIFIER.
No. 488,977.     Patented Jan. 3, 1893.
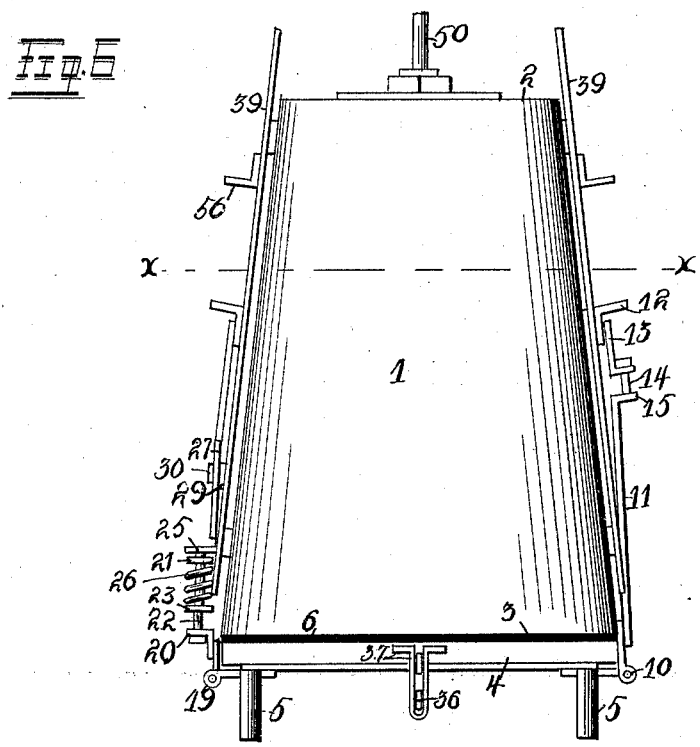
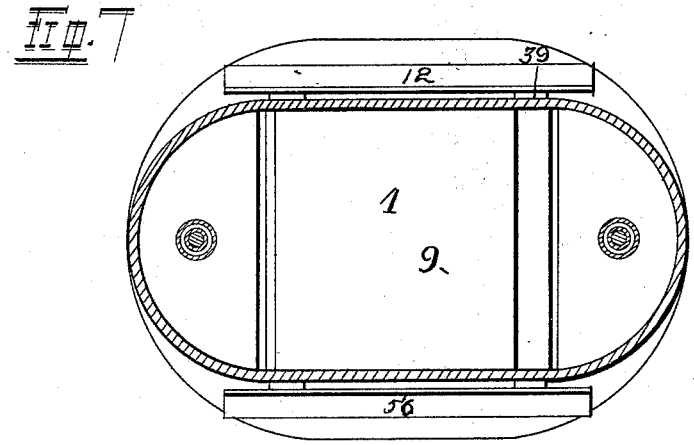
Witnesses
A. A. Eichs
O. F. Keller
Inventor
John H Archer
By his Attorneys
Hyden Hyden Longan
THE NORRIS PETERS CO., PHOTO-LITHO., WASHINGTON, D. C.

UNITED STATES PATENT OFFICE.

JOHN H. ARCHER, OF ST. LOUIS, MISSOURI.

WATER-PURIFIER.

SPECIFICATION forming part of Letters Patent No. 488,977, dated January 3, 1893.

Application filed March 15, 1892. Serial No. 425,060. (No model.)

*To all whom it may concern:*

Be it known that I, JOHN H. ARCHER, of the city of St. Louis and State of Missouri, have invented certain new and useful Improvements in Water-Purifiers, of which the following is a full, clear, and exact description, reference being had to the accompanying drawings, forming a part hereof.

My invention relates to improvements in "water purifiers," and consists in the novel arrangement and combination of parts, as will be more fully hereinafter described and designated in the claims.

Figure 3:
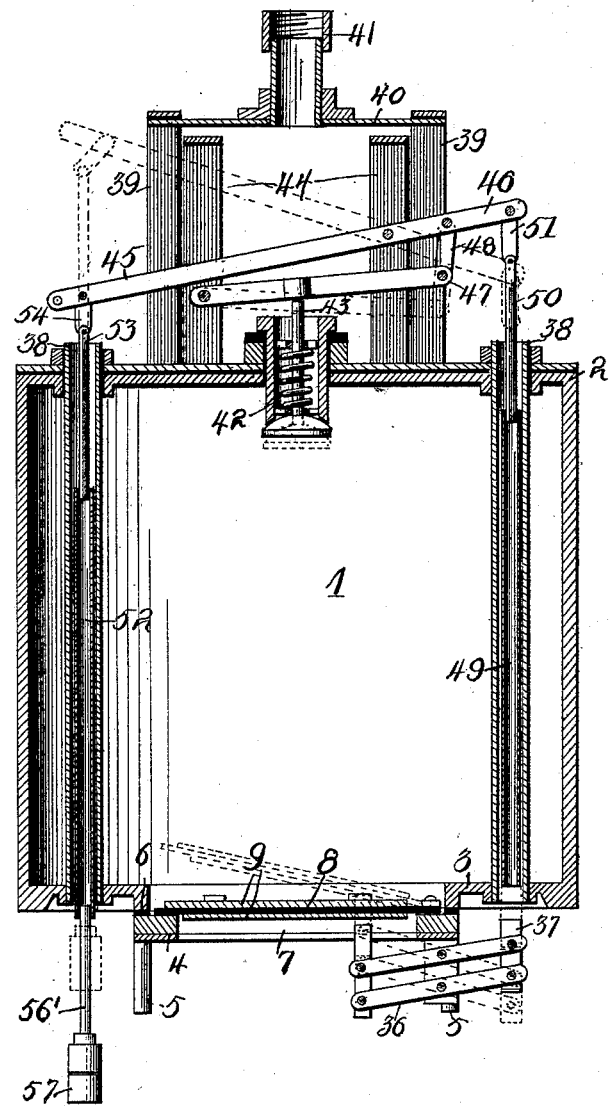
Figure 4:
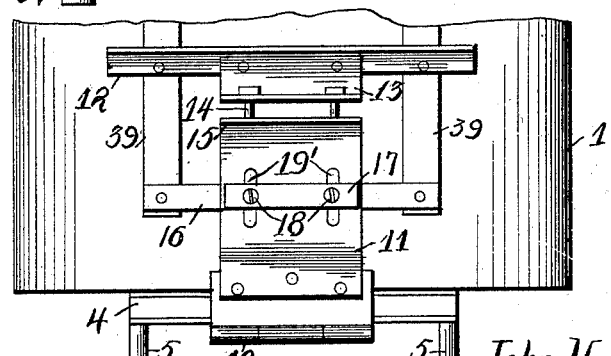

In the drawings:—Figure 1, is a side elevation of my complete invention, showing the parts composing the same, in a normal position. Fig. 2, is a perspective view of the ratchet tooth bar and the cam in contact therewith for holding said tooth-bar in a locked position. Fig. 3, is a vertical longitudinal section of my complete invention, showing the reversed position of the movable parts in dotted lines. Fig. 4, is a side elevation of the lower portion of the receptacle showing the manner of constructing the hinge which I employ in carrying out my invention. Fig. 5, is a perspective view of the parallel levers which are attached to the hinged bottom of the receptacle and arranged to operate a hinged door. Fig. 6, is a side elevation of the receptacle showing more particularly the shape of the same, and Fig. 7, is a horizontal cross section taken on the line $xx$ of Fig. 6.

The device that I am about to describe is intended for purifying by aeration the water in wells, cisterns, tanks and reservoirs, and for removing the sediment from the same.

My invention consists of a hollow receptacle or vessel constructed of any suitable material and having any shape and dimension desired.

Referring to the drawings:—1, represents a receptacle or vessel, having a closed top 2 and a partially closed bottom 3. Said receptacle or vessel is truncated in longitudinal dimensions, and approximately elliptical in cross section as better illustrated in Figs. 6 and 7 of the drawings, which causes the sediment passing into the same to be deposited in the bottom of the receptacle when the same strikes the side thereof.

4, represents the hinged bottom for the said vessel or receptacle, which is hinged to the same at one edge thereof in a manner hereinafter more fully set forth. Said hinged bottom is provided with four legs 5 upon which the entire device is adapted to rest, and secured to the upper edge of the said bottom is packing material 6 which is adapted to come in contact with the bottom 3 of the receptacle forming a water tight connection between the same. The said hinged bottom 4 is provided with an opening 7 which is covered normally by a flexible hinged door or lid 8, which door lid is provided with suitable metallic plates 9, the weight of which causes the same to normally close the opening 7 formed in the said bottom. The hinge for the said bottom 4 is better illustrated in Fig. 4 of the drawings, the construction of which I shall now proceed to describe.

10 represents a hinge of the ordinary construction, one leaf of which is attached to the bottom 4, and the opposite leaf secured to an adjustable plate 11.

12 represents an angle shaped plate, to which is attached a second angle shaped plate 13, which is somewhat shorter through which screws or bolts 14 are adapted to loosely pass.

Formed in the horizontal or projecting portion 15 of the plate 11 are screw-threaded openings which are adapted to receive the screw-threaded ends of the bolts 14, whereby a compensating hinge is constructed for taking up all wear of the packing material 6. To the lower ends of the supports is attached a bar 16, against which the plate 11 comes in contact and located on the outside of the said plate is a shorter bar 17 through which screws 18 are adapted to be passed, and also through the parallel slots 19′ formed in the said plate 11, and their ends screwed into the said bar 16. When it is desired to adjust the hinge, the screws 18 are loosened, relieving the said plate 11 of its clamped position, and in this position the screws or bolts 14 are turned in the proper direction.

In order to lock the door against the bottom 4 of the receptacle, I employ the mechanism that I shall now proceed to describe, which is located opposite that edge of the said bottom 4 to which the hinge previously described is secured.

19 represents a hinge, one leaf of which is secured to the under surface of the bottom 4, and the other leaf attached to an angle-shaped plate 20.

21, represents a flat plate which is rigidly attached to one portion of the plate 20 by means of two vertical parallel rods 22, guiding and holding the movable parts of the locking clamp.

23, represents a plate which is provided with a suitable opening and adapted to be guided by the rods 22, and 24 is a bolt, which passes through an intermediate opening formed in the said plate 23 and loosely through an intermediate opening formed in the plate 21, and the end of the said bolt screwed into an angle-shaped plate 25. Encircling said rods 22, and interposed between the plates 23 and 21 are coil springs 26. Rigidly attached to the plate 25 is a plate 27—in which is formed an elongated opening 28 which diminishes in size as clearly shown in Fig. 1. Loosely attached to one of the supporting bars is one end of a lever 29, which is adapted to be moved vertically, and is provided with a rounded projection 30 which is adapted to be passed into the elongated opening 28 of the plate 27 when the same is in its lowest position, but locked in said plate when the same is in position as shown in Fig. 1 by reason of the shape of the said opening. Loosely attached to the said lever 29 is a ratchet tooth bar 31, which is held in the proper position by the guide 32, which also provides means for receiving the teeth of said bar. Loosely attached to the said guide 32 is a gravity-cam 33, which normally rests against the smooth surface of the said bar 31 and is provided with a knob 34 for removing the same from its locked position against said ratchet-tooth bar.

In Fig. 1 the lock above referred to is shown in a locked position, and in order to release the same the cam 33 is released from its contact position allowing the ratchet tooth bar 31 to be moved from contact with the guide 32 allowing the lever 29 to be lowered, in which position the slotted plate 27 can be moved from its locked position and the bottom 4 opened, for removing all sediment contained in the receptacle. Thus it will be seen that a flexible lock is constructed which will effectually lock the hinged bottom 4 to the receptacle, and further when the same is in said position a thoroughly water tight connection is made.

35 represents two angle-shaped plates which are attached to the under surface of the bottom 4 near the edge thereof between which are movably secured two parallel operating levers 36. To the ends of the said levers are attached movable guide-plates 37, which are adapted to be moved vertically one of which is brought in contact with the bottom of the valve or door 8 carried by the bottom 4, when the opposite one is struck by the mechanism hereinafter described, for opening the said door or valve as shown in dotted lines in Fig. 3. Thus it will be seen that the guide-plates 37 are operated parallel to one another, and always in a vertical direction, by the employment of the parallel levers 36, above described.

38 represent two pipes or tubes, which are oppositely located within the said receptacle, and in communication with the outside of the same, but are in water tight connection with the interior of said receptacle.

To the opposite sides of the receptacles 1 are attached the ends of the supporting bars 39, the intermediate portions of which are curved or suitably shaped and extend a suitable distance above the top of the said receptacle, to which portion of said bars is secured a plate 40, to which are attached suitable coupling connections 41, for receiving a section of pipe for forcing the receptacle through the water desired to be purified.

42 represents a spring valve which is fastened to a suitable opening formed in the top of the receptacle 1, and is in communication with the interior thereof, and is adapted to be normally loosened and opened when pressure is applied to the stem 43 of the said valve for allowing the air contained in said receptacle to pass out of the same and be replaced by the sediment.

44 represent two additional supports which are attached to the top of the receptacle 1, to which is attached a compound lever 45. Said lever is composed of two arms the longer one 46 of which is attached to one of the supports 44 at a suitable distance from either of its ends, and the shorter arm 47, loosely attached to the opposite support 44 at one of its ends. To the opposite end of the said short arm 47 is attached a connecting plate 48, which is also movably attached to the long arm 46, whereby a movable connection is made between said arm, which when the short arm 47 is depressed the same will come in contact with the stem 43, and open the valve 42 for allowing the air contained therein to escape through the water above the same, purifying the said water.

49 represents a pipe which is located within one of the vertical pipes 38 and is adapted to freely move therein, in a vertical direction, and secured to the upper end of the said pipe is a connecting-rod 50, and attached to one end of the arm 46 of the compound lever are loosely attached links 51, which are likewise movably attached to the upper ends of the connecting-rods 50 forming a movable connection between the compound lever 45 and the pipe 49.

Located in the opposite pipe 38 is a pipe 52 which is also adapted to be moved vertically within the same, to which is attached a connecting rod 53, and on the upper end of said connecting rod are loosely attached plates 54, and said plates loosely attached to the opposite end of the arm 46 of the compound lever 45.

To one end of the arm 46 of the compound lever is detachably attached an operating cord or rope 55, which when the receptacle is forced into the water by the sections of pipes attached to the same, and the said cord pulled, motion will be imparted to said compound-lever, which in turn opens the valve 42 and the valve or door 8 carried by the hinged bottom 4 by the pipe 49 coming in contact with one of the guides 37 of the parallel levers 36 as shown in dotted lines in Fig. 3.

Located on each side of the receptacle 1, and attached to the supporting bars 39 are right angle shaped plates 56, between which weights are adapted to be placed for forcing the receptacle through the water to be treated in which instance the sections of pipes before described as being attached to the coupling 41 are dispensed with and an ordinary rope attached to said portion for lowering the same to its proper depth.

The cord or rope referred to is only used when very deep cisterns or wells are to be operated upon and purified in which instance the operating rope or cord 55 is dispensed with or removed from the compound lever 45, otherwise the device in turning will be twisted around the rope attached to the same for lowering the receptacle. In this instance I attach to the pipe 52 a rod 56′, the lower end of which is provided with an enlarged portion 57 which is adapted to be brought in contact with the bottom of the cisterns or wells the weight of said receptacle causing the said pipe 52 to be elevated, and the pipe 49 to be depressed by the action of the compound lever, opening the valve or door 8, and the valve 42 in a manner previously described without the use of the operating cord or rope 35.

When the device is in its normal position, namely, the valves 42 and 8 closed, in the position as shown in Fig. 3, the receptacle 1 will be filled with air, and in this condition the said receptacle is forced into the water desired to be purified. After the device has been located at the bottom of the well or cistern, the valves above referred to are simultaneously opened, in which instance the air contained in the said receptacle will pass out of the valve 42 through the water located around the said receptacle, purifying the water by aeration, and at the same time forming a suction which causes all sediment or impurities to be drawn into the receptacle through the opening 7 as the air passes out of the said receptacle.

Having fully described my invention, what I claim is,

1. A water purifier consisting of a receptacle which is approximately elliptical in cross section, a hinged bottom fixed to the same, a valve or door fixed to the said bottom and adapted to close the space formed therein, a valve located in the top of the said receptacle and in communication with the interior thereof, a compound-lever movably attached to suitable supports above the said last named valve and adapted to be brought in contact with the same, when the said compound-lever is operated, and means attached to the said compound lever for opening the said valve carried by the hinged door when the valve located in the top of the receptacle is opened, substantially as described.

2. A water purifier having a hinged bottom, rods such as 22 attached to the hinge carried by the same, springs encircling said rods against which the movable plate 23 is adapted to be brought in contact, a bolt 24 passing through said plate 23 and attached to a plate 25, and a plate such as 27 provided with an elongated opening 28 which is adapted to receive a suitable projection carried upon the movable lever—substantially as described.

3. A water purifier having a hinged bottom, a hasp flexibly attached to the same, a lever adapted to engage with said hasp, a ratchet tooth bar carried by the said lever the teeth of which are adapted to engage a suitable guide and a cam adapted to bear against said tooth-bar for holding the same against the said guide, whereby the said hasp is held in a locked position, substantially as described.

4. A water purifier consisting of a receptacle, having a hinged bottom, pipes passing through the same and in communication with the outside, a valve located in the top of the said receptacle, a compound-lever movably attached to suitable supports carried by the said receptacle, the short arm 47 of which is adapted to be brought in contact with said valve for opening the same, a pipe located in one of the said tubes carried by the said receptacle, and in suitable connection with the long arm 46 of the compound lever, the lower end of which is adapted to be brought in contact with a suitable device for opening the valve carried by the hinged bottom and an operating cord or rope adapted to be attached to the opposite end of the said arm 4 for operating the said valves simultaneously, substantially as described.

5. A water purifier having a compound lever attached to suitable supports secured to the top of the same, pipes such as 52 and 49 in movable connection with the said compound-lever, one of which is adapted to be brought in contact with a suitable device for opening the valve located in the bottom of the said purifier, a rod such as 56′ attached to the opposite pipe 52, the lower end of which is adapted to be depressed, and pipes 38 encircling said pipes 52 and 49 for guiding the same and in communication only with the outside, substantially as described.

6. A water purifier consisting of a receptacle such as 1, parallel oppositely located pipes 38 passing through the same and in communication with the outside only, a partially closed bottom 3 formed with or attached to the said receptacle, a hinged bottom such as 4, an elastic lock hinged to the said door, an opening 7 formed in the said bottom, a valve hinged to the said bottom 4 and adapted to normally close said opening, parallel levers movably attached to the said hinged bottom and having suitable guides attached thereto, one of which is adapted to come in contact with the said valve for opening the same, pipes such as 52 and 49 located within the said pipes 48, a compound lever movably attached to suitable supports carried by the said receptacle, the long arm 46 of which is in movable connection with the said pipes 52 and 49, and a short lever 47 movably attached to one of said supports and to the said long arm and adapted to be brought in contact with a suitable valve located in the top of the receptacle when the pipe 49 is depressed and brought in contact with the opposite guide carried by the parallel levers, substantially as described.

In testimony whereof I affix my signature in presence of two witnesses.

JOHN H. ARCHER.

Witnesses:
C. F. KEELER,
ED. E. LONGAN.